Dec. 27, 1966  C. D. PRATER ET AL  3,294,859
MULTICOMPONENT REACTION ANALYSIS AND CONTROL
Filed Oct. 31, 1961  5 Sheets-Sheet 1

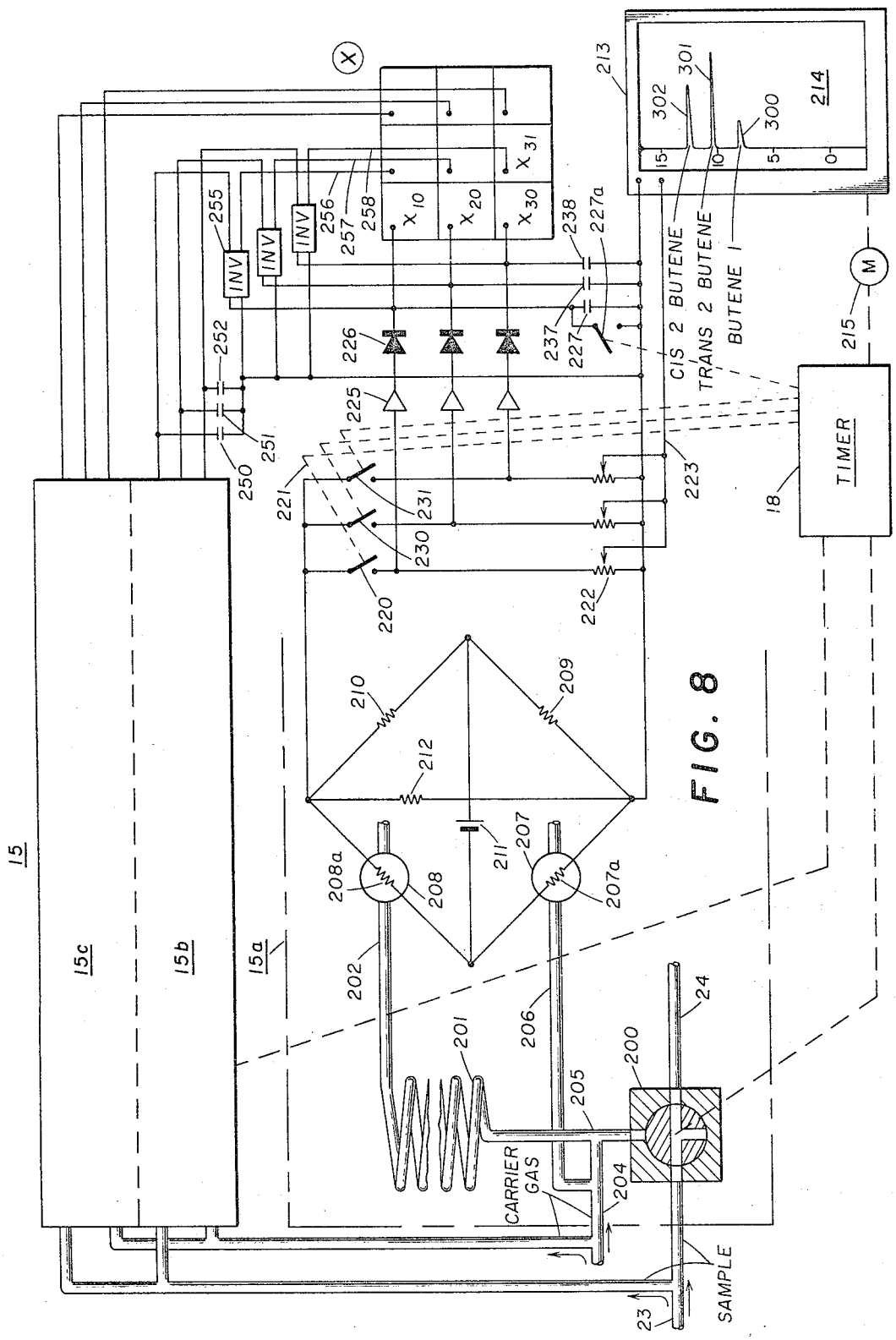

United States Patent Office 3,294,859
Patented Dec. 27, 1966

3,294,859
MULTICOMPONENT REACTION ANALYSIS
AND CONTROL
Charles D. Prater, Pitman, and James Wei, Sewell, N.J.,
assignors to Mobil Oil Corporation, a corporation of
New York
Filed Oct. 31, 1961, Ser. No. 149,116
10 Claims. (Cl. 260—683.2)

This invention relates to the analysis and control of complex reaction systems and more particularly to the evaluation and utilization of rate constant functions in complex reaction systems such as those involving chemical kinetics, biochemistry, radioactive decay and the like.

In catalytic and enzyme chemistry highly coupled systems of chemical reactions involving several chemical species often are encountered. It is important to understand the relationship between the concentration of the various species during the course of the reaction, and furthermore, to relate the concentration changes to a minimal number of concentration independent parameters that characterize the reacting system. The behavior of even linear systems containing only three reacting species is complicated enough so that its basic dynamic behavior is difficult to visualize.

It is an object of the present invention to provide a method and a system for analysis of the structure of kinetic systems. By structure is meant qualitative and quantitative features that are common to large well-defined classes of chemical reaction systems. The approach is one that involves a geometrical interpretation of the behavior of the reaction systems. Matrix algebra is used as a tool for the manipulation of the geometric interpretation; only elementary matrix operations, however, are involved.

It is a further object of the invention to provide models and procedures that yield reliable values of the rate parameters from a minimal number of experimental data for complex reaction systems. From this, guidance is automatically obtained as to the kind and number of measurements needed in order to optimize economy and accuracy in analysis and control programs.

For purposes of illustrating the present invention reference will be made to a particular class of reaction systems, namely, monomolecular systems. A reaction system of ($n$) molecular species is called monomolecular if the couplings between each pair of species are by first order reactions only. These linear systems are satisfactory representations for many rate processes over the entire range of reaction and are linear approximations for any system over limited portions of the range.

Two such classes of monomolecular systems are of importance, i.e., reversible and irreversible. A reaction system is called reversible monomolecular if the coupling between species is by reversible first order reactions only. A typical example of a reversible monomolecular system is where the following symbolical pattern may be employed:

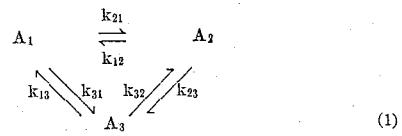

(1)

The $i^{\text{th}}$ species of the monomolecular reaction system is designated by $A_i$ and the amount by $a_i$. The rate constant for the reaction of the $i^{\text{th}}$ species to the $j^{\text{th}}$ species is $k_{ji}$, i.e.,

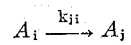

there will be no $k$'s of the form $k_{ii}$. Using this system of notation, Equation 1 is the most general three-component monomolecular reaction system. The rate of change of the amount of each species in Equation 1 is given by the following set of equations:

$$\frac{da_1}{dt} = -(k_{21}+k_{31})a_1 + k_{12}a_2 + k_{13}a_3 \qquad (2)$$

$$\frac{da_2}{dt} = +k_{21}a_1 - (k_{12}+k_{23})a_2 + k_{32}a_3$$

$$\frac{da_3}{dt} = +k_{31}a_1 + k_{23}a_2 - (k_{13}+k_{32})a_3$$

The right side of the set (2) is written so that the various species are in numerical order—$a_1$, $a_2$, and then $a_3$. The negative term on the right of the $i^{\text{th}}$ equation of set (2) is the sum of the reaction rates away from the $i^{\text{th}}$ species and the remaining terms are the reaction rates of each $j^{\text{th}}$ species back to the $i^{\text{th}}$ species.

The structure of set (2) leads to the following generalization for $n$-component systems:

$$\frac{da_1}{dt} = -\left(\sum_{j=1}^{n}{}' k_{j1}\right)a_1 + k_{12}a_2 \cdots + k_{1m}a_m \quad \cdots + k_{1n}a_n$$

$$\vdots$$

$$\frac{da_m}{dt} = +k_{m1}a_1 + k_{m2}a_2 \cdots - \left(\sum_{j=1}^{n}{}' k_{jm}\right)a_m \cdots + k_{mn}a_n$$

$$\vdots$$

$$\frac{da_n}{dt} = +k_{n1}a_1 + k_{n2}a_2 \cdots + k_{nm}a_m \quad \cdots - \left(\sum_{j=1}^{n}{}' k_{jn}\right)a_n$$

(3)

where the absence of $k$'s of the form $k_{ii}$ from each summation term is signified by the prime notation ($'$), i.e., $$\sum_{j=1}^{n}{}' k_{ji}$$

is the sum of the $k_{ji}$'s for all $j$'s from 1 to $n$ except $j=i$.

The general solution to a set of linear first order differential equations such as set (3) is well-known. However, the inverse process of determining the rate constant, $k_{ji}$, from the experimentally observed time course of the reaction has presented great difficulties.

The chief difficulties with such complex reaction systems arise not so much from the mathematical solutions but from the application of the solutions to data when the experimental rate constants are unknown. No general methods have been devised for such applications prior to the present invention. Prior cases treated have been attacked more or less by trial and error and a judicious choice of experimental conditions.

Two systems readily adaptable to illustration of the invention without unduly extending the discussion are (1) the isomeric conversion among 1-butene, cis-2-butene and trans-2-butene, and (2) the system cyclohexane, cyclohexene and benzene. It will be noted that the second system of reference involves two stages of reversible hydrogenation-dehydrogenation, while the isomerization of butenes is a direct conversion of one molecular species to another without interaction between the reactant species and another molecular species. However, the cyclohexane, cyclohexene, benzene system does behave in the same manner as a first order reaction insofar as chemical kinetics is concerned since the reaction takes place in the presence of such great excess of hydrogen that change in concentration of the latter molecular species is wholly insignificant and may be disregarded.

Considering further the system cyclohexane, cyclohexene, benzene, in which the components may be designated I, II and III, respectively, for purposes of simplicity; component II is reversibly convertible to either components I or III through hydrogenation-dehydrogenation routes. This reaction is important in such commercial processes as catalytic reforming of virgin gasoline to substantially increase the octane number of the product as compared with the charge. The reaction appears relatively simple, even as compared to the butene isomerization reaction where each of the molecular species is reversibly convertible to each of the other species. Thus, the I, II, III reaction under consideration involves only two chemical equilibria on the catalyst surface, each involving a forward and a reverse reaction. Each of these two forward and two reverse reactions is governed by a very definite reaction rate constant which when multiplied by concentration of the reacting material will yield a value representing rate of formation of the product.

The rate of change of each component can be represented by a differential equation such as in set (3) but when the system of three species is considered, the formation of component III is not adequately represented without taking into account the rate of increase or decrease of component II due to the two reversible reactions undergone by component II. Thus even for this relatively simple and straightforward system the equations of state are quite complex.

In addition to the explicit chemical equilibria discussed above, physical equilibria must be considered in any practical analysis of the system. The reaction is conducted at reasonable rates only in the presence of catalyst, such as platinum supported on alumina. Therefore, the rates of the following chemical and physical reactions and the modes in which these reactions dynamically interact with each other must be properly accounted for in any mathematical model of a practical system:

(1) Adsorption of component I on the catalyst
(2) Desorption of component I from the catalyst
(3) Dehydrogenation of component I to component II
(4) Hydrogenation of component II to component I
(5) Adsorption of component II on the catalyst
(6) Desorption of component II from the catalyst
(7) Adsorption of hydrogen on the catalyst
(8) Desorption of hydrogen from the catalyst
(9) Dehydrogenation of component II to component III
(10) Hydrogenation of component III to component II
(11) Adsorption of component III on the catalyst
(12) Desorption of component III from the catalyst
(13) Adsorption of "poisons" on the catalyst (may be important to any of the above reactions)
(14) Desorption of "poisons" from the catalyst (may be important to any of the above reactions).

A mathematical model of the system will include (a) concentrations of the chemical species involved, (b) the specific rate constants of all the chemical and physical reactions involved, and (c) time. For example, the model for the rate of disappearance of component I is formulated thus:

$$-\frac{dS}{dt} = \frac{k_3 B_0 \left[\left(S - \frac{MN^3}{K_M}\right) + \frac{k_9}{k_5}\left(1 + \frac{k_6 N^2}{k_7}\right)\left(S - \frac{RN}{K_R}\right)\right]}{HS + H'M + H''R + G} \quad (4)$$

where $-\dfrac{dS}{dt}$ = rate of decrease in component I concentration with time $S$ = concentration of component I
$M$ = concentration of component III
$R$ = concentration of component II
$N$ = concentration of hydrogen
$B_0$ = number of active catalytic sites
$k$'s = rate constants of various reaction steps
$H'$, $H''$, and $G$ = functions of these rate constants
$K$'s = thermodynamic equilibrium constants.

There are two additional mathematical relations similar to the above which must be dealt with; one for the formation of component II, and one for the formation of component III.

A major problem in handling relations of this type is integration of the complex right-hand side of equations such as that set out above. The present invention provides a major advance in handling this extremely difficult technical situation and rests on the discovery that mathematically a 3-component reaction sequence such as that here considered can be summarized in the very simple formula, $$Y = pX^r \quad (5)$$

where X and Y are a set of oblique axes, both involving concentrations of all three components; where the intersection of X and Y (the origin) is at the thermodynamic equilibrium concentration of the three components for a specified temperature; where $r$ is a constant of this specific three component reaction system; and where $p$ is a constant representing the initial concentration. Furthermore, $r$ can be related back to terms in the three equations typified by the complex differential equation above and is thus useful in evaluating those terms.

A three component system was selected for ease of illustration since ternary diagrams can be used to represent concentrations in those systems. Such a ternary diagram is shown in FIG. 1 of the attached drawings and will be discussed in more detail hereinafter. Systems of a greater number of components can also be represented by relatively simple equations utilizing the principles of this invention but are readily described only through mathematics due to the difficulty of planar representations of space having more than three dimensions.

According to the invention, reacting sytems of any number of molecular species are analyzed for the purpose of control and the like by means of a simple general solution. Instead of considering the actual molecular species with highly coupled rate equations, the invention teaches transformation to a number of fictitious molecular species in the completely uncoupled rate equations. It will be shown hereinafter the concentration of each fictitious species decreases with time according to its own characteristics reaction rate constant. The rate of decay of each fictitious species is independent of any other species. The compositions of fictitious species are given by linear functions of the real molecular species and are represented by straight line reaction paths in the composition space. The shift of coordinates from the molecular species to the fictitious species reduces the equation for any reaction path in the composition space to relatively simple equations of the general type noted above in Equation 5.

More particularly the present invention involves processing multicomponent mixtures to equilibrium composition under controlled process conditions where the relative amounts of constituents of each of a plurality of different starting mixtures are known to be representative of straight line reaction paths leading to said equilibrium composition in a composition space which paths are orthogonal one with respect to the other in terms of an equilibrium weight function. There is provided a method which involves the steps of measuring relative proportions of said constituents at at least two points along each of said reaction paths for determination of ratios of reaction rates along said paths and generating physical representations of at least two $n \times n$ matrices where a first matrix $X$ is representative of $n$-constituents of $n-1$ starting mixtures and said equilibrium composition and the second matrix $\wedge'$ is a diagonal matrix of the ratios of reaction rates along said paths.

In a further aspect of the invention there are generated physical functions representative of a reaction rate matrix by obtaining the product of three $n \times n$ matrices where the first matrix $X$ is representative of $n$-constituents of $n-1$ starting mixtures and said equilibrium composition, the second matrix $\wedge'$ is a diagonal matrix of the ratios of reaction rates along the straight line reaction paths and the third matrix $X^{-1}$ is the inverse matrix of the first matrix $X$.

In a still further aspect of the invention there is provided a process control system comprising a primary reactor and an analog reactor with a primary feed system leading to the primary reactor and a test feed leading to the secondary reactor. Means are provided for repetitively cycling the analog reactor to equilibrium from secondary compositions in number equal to $n-2$ times the constituents in the primary feed stock for identification of the composition of constituents therein at equilibrium and along $n-1$ straight line reaction paths leading to equilibrium in composition space which paths in said space are orthogonal. Means are provided for measuring compositions at at least two points along each of said reaction paths. Means are provided for generating physical representations of the ratios of reaction rates along said paths from said two measurements on each said path. Responsive thereto means are then provided for forming physical representations of two $n \times n$ matrices $X$ and $\wedge'$. A linkage is then provided leading to said primary reactor for exercising control of the process conditions and in dependence upon the properties of said two $n \times n$ matrices.

For a more complete understanding of the present invention and for further objects and advantages thereof, reference may now be had to the following description taken in conjunction with the accompanying drawings in which:

FIG. 8 illustrates components of the analyzer and control units of FIG. 2.

Figure 2:
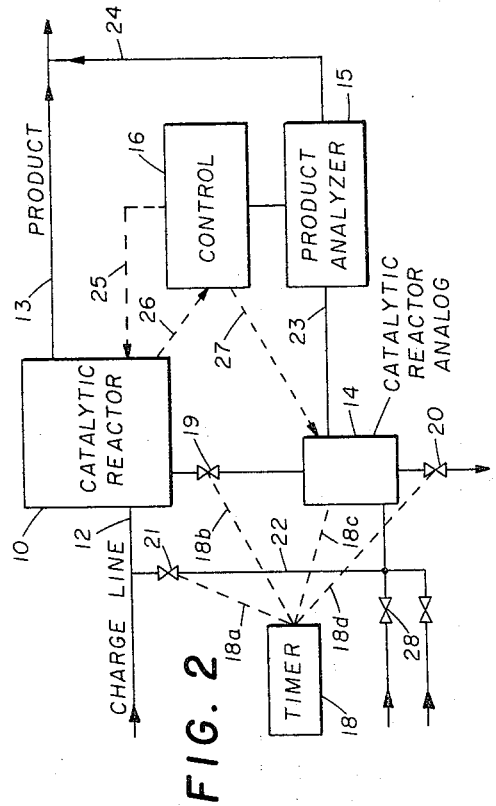
FIG. 2 is a simplified diagram of a reactor control system.

Before describing the drawings in detail, the following will be helpful in understanding the nature of the present invention. An examination of equation set (3) showing that the rate of change of the amount, $a_1$ of each species depends not only on $a_1$ but on the amounts $a_j$ of other species as well. Thus, changes in the amount of $A_j$ during the reaction affect the amounts of species $A_i$; there is strong coupling between the variables $a_i$ in the set of equation set (3). It is thus coupling between the variables $a_i$ and $a_j$ which is the source of the difficulties outlined above. A monomolecular reaction system with $n$ species $A_i$ can be transformed, by means of appropriate operations involving only addition and multiplication, into a more convenient equivalent monomolecular reaction system with $n$ hypothetical new species $B_i$ that has the property that changes in the amount $b_i$ of any species $B_i$ do not affect the amount of any other species $B_j$. This means that there is a set of species $B_i$ equivalent to the set of species $A_i$ such that the variable $b_i$ in the rate equations for the B species are completely uncoupled.

For example, there is a three component reaction system with species $B_0$, $B_1$ and $B_2$ equivalent to the reaction system (1) such that $B_0$ does not react $$B_1 \xrightarrow{\lambda_1} 0$$

$$B_2 \xrightarrow{\lambda_2} 0 \tag{6}$$

The rate equations for (6) are $$\frac{db_0}{dt} = 0,$$

$$\frac{db_1}{dt} = -\lambda_1 b_1,$$

$$\frac{db_2}{dt} = -\lambda_2 b_2; \tag{7}$$

they are a set of simple completely uncoupled differential equations. The above system (6) can, of course, be readily generalized to $n$-component systems.

In accordance with the present invention (1) the transform required to change a given composition from the A to the B system of species (and vice versa) is determined from appropriate experimental data, (2) the rate constants $\lambda_i$ for the B system of species are measured, and (3) the measured rate constants $\lambda_i$ for the B system are then changed to the rate constants $k$ for the A system by the same experimentally measured transforms obtained in step (1). Thus, the rate constants $k$ are derived from experimentally measured rate constants, $\lambda_i$, and transforms.

The geometry of the system

A geometrical interpretation is facilitated by expressing the set of Equation 3 in matrix form. This change represents a new point of view and is not used merely as a shorthand notation for these equations. A three-component system will be used so that equation set (3) in matrix form becomes $$\begin{bmatrix} \frac{da_1}{dt} \\ \frac{da_2}{dt} \\ \frac{da_3}{dt} \end{bmatrix} = \begin{bmatrix} -(k_{21}+k_{31}) & k_{12} & k_{13} \\ k_{21} & -(k_{12}+k_{32}) & k_{23} \\ k_{31} & k_{32} & -(k_{13}+k_{23}) \end{bmatrix} \begin{bmatrix} a_1 \\ a_2 \\ a_3 \end{bmatrix}$$

(8)

Figure 1:
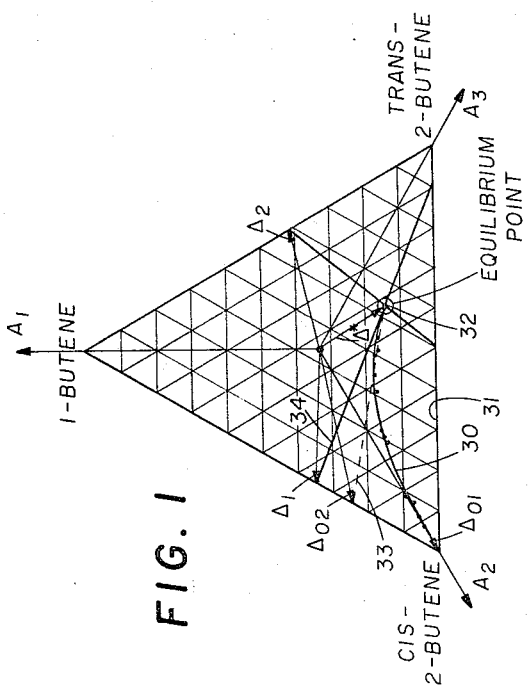
FIG. 1 is a typical ternary diagram for the system 1-butene, cis-2-butene and trans-2-butene.

The column matrices $$\begin{pmatrix} \frac{da_1}{dt} \\ \frac{da_2}{dt} \\ \frac{da_3}{dt} \end{pmatrix} \text{ and } \begin{pmatrix} a_1 \\ a_2 \\ a_3 \end{pmatrix} \qquad (9)$$

may be interpreted as vectors in three dimensional space. The column matrix $$\begin{pmatrix} a_1 \\ a_2 \\ a_3 \end{pmatrix} \qquad (9b)$$

may be designated by $\Delta$. FIG. 1 shows a three-dimensional coordinate system with the species $A_1$ as axes and $\Delta$ as a vector directed from the origin to the composition point with coordinates ($a_1$, $a_2$, $a_3$) on their respective axes. This set of coordinate axes defines a composition space for the whole reacting system and the vector $\Delta$, terminating at the composition point, is the composition vector.

The column matrix $$\begin{pmatrix} \frac{da_1}{dt} \\ \frac{da_2}{dt} \\ \frac{da_3}{dt} \end{pmatrix} \qquad (9a)$$

may be written $d\Delta/dt$ and interpreted as the time rate of change of the composition vector $\Delta$ in composition space. Thus, instead of considering the amount of each component $a_i$ separately as is done in the set of Equations 2, the composition of the reacting systems at any particular time, $t$, is now treated as an entity, i.e., the vector $\Delta(t)$.

Let the square matrix set (8) be designated by K:

$$K = \begin{pmatrix} -(k_{21}+k_{31}) & k_{12} & k_{13} \\ k_{21} & -(k_{12}+k_{32}) & k_{23} \\ k_{31} & k_{32} & -(k_{13}+k_{23}) \end{pmatrix} \qquad (10)$$

The matrix K may be thought of as an operator or transform which changes vectors into other vectors; it may, therefore, be treated as an entity. The set of Equations 2 then reduces to the single equation.

$$\frac{d\Delta}{dt} = K\Delta \qquad (11)$$

There are two constraints on these reacting systems:
(1) The total mass of the reacting system is conserved (law of conservation of mass)
(2) There can be no negative amounts.
It is convenient to manipulate the amount of the various species as mole fractions so that the law of conservation of mass is given by $$\sum_{i=1}^{n} a_i = 1 \qquad (12)$$

Constraint (2) gives $$a_i \geq 0 \qquad (13)$$

for all values of $i$.

Constraint (12) confines the end of the vector $\Delta$ to the plane passing through the points (1, 0, 0), (0, 1, 0) and (0, 0, 1); constraint (13) further confines the end of $\Delta$ to the equilateral triangle defining that part of this plane lying in the positive octant of the coordinate system $A_1$, $A_2$ and $A_3$ as shown in FIG. 1. This equilateral triangle of FIG. 1 will be called the reaction triangle and the plane on which it lies the reaction or phase plane. As the reaction proceeds, the composition point, i.e., the composition at the end of the composition vector $\Delta(t)$, moves along the reaction plane towards the equilibrium point at the end of the equilibrium composition vector $\Delta^*$ with components $a_1^*$, $a_2^*$ and $a_3^*$. The curve that the composition point traces out as it goes to equilibrium lies on the reaction triangle and is sufficient to describe the composition change during the course of the effective reaction. This curve will be called the reaction path for the particular starting composition $\Delta(0)$. Thus, the reaction plane with one dimension less than the composition space is sufficient to describe many properties of the system.

Due to the unique properties of the composition vector $\Delta$ as described with reference to the reaction or phase plane, it can be shown that the matrix K of Equation 10 may be evaluated directly from the following relationships:

$$K = \lambda_2 X \wedge 'X^{-1} = \lambda_2 K' \qquad (14)$$

where $\lambda_2$ is the value of reaction rate along a reaction path corresponding with the decay of the species $B_2$ of Equation 6 the matrix X is:

$$\begin{pmatrix} x_{10} & x_{11} & x_{12} \\ x_{20} & x_{21} & x_{22} \\ x_{30} & x_{31} & x_{32} \end{pmatrix} \qquad (15)$$

the matrix $\wedge'$ is:

$$\begin{pmatrix} 0 & 0 & 0 \\ 0 & -\lambda_1/\lambda_2 & 0 \\ 0 & 0 & -\lambda_2/\lambda_2 \end{pmatrix} \qquad (16)$$

and the matrix $X^{-1}$ is determined from the following relationship:

$$X^{-1} = L^{-1} X^T D^{-1} \qquad (17)$$

where $X^T$ is the X matrix (15) but with rows and columns interchanged; i.e.:

$$\begin{pmatrix} x_{10} & x_{20} & x_{30} \\ x_{11} & x_{21} & x_{31} \\ x_{12} & x_{22} & x_{32} \end{pmatrix} \qquad (18)$$

$D^{-1}$ is a diagonal matrix formed from the first column of the X matrix, i.e., it is of the form:

$$\begin{pmatrix} \frac{1}{x_{10}} & 0 & 0 \\ 0 & \frac{1}{x_{20}} & 0 \\ 0 & 0 & \frac{1}{x_{30}} \end{pmatrix} \qquad (19)$$

$L^{-1}$ is an inverse diagonal matrix where the related L matrix is determined by:

$$L = X^T D^{-1} X \qquad (20)$$

All information necessary to evaluate the foregoing matrices is readily obtainable from fairly simple experimental procedures. Furthermore, the system leads to the generation of output functions which are dependent upon some or all of the foregoing matrices and which are useful in control of reaction systems.

More particularly, while Equation 14 may be solved for a complete evaluation of the various rate constants, the relative rate constants may be completely described from an evaluation of the X matrix (15) and the $\wedge'$ matrix (16). For control purposes the latter two matrices may be employed just as readily as a complete evaluation of the K matrix from Equation 14.

In order to illustrate an application of the present invention to the three-component system illustrated in FIG. 1, a procedure will be explained symbolically along with numerical values. It will then be shown how the procedure can be generalized to an $n$-component system from the relatively simple three-component system of FIG. 1.

The example will be described as pertaining to operations in the system illustrated in FIG. 2. In FIG. 2 there is illustrated a catalytic reactor 10 having a feed line 12 leading thereto and a products line 13 leading from the reactor. The reactor 10 is operated under a set of controllable conditions as to temperature, pressure, flow rates and the like such that the quality of the product in the line 13 can be to a measure controlled in dependence upon the operating parameters. Furthermore, the input or charging stock introduced by way of line 12 may be modified or varied by pretreatment or by additives or the like in order to produce a product in line 13 that satisfies a given demand placed on the system.

Also illustrated in this system is a catalytic reactor analog 14 which is connected by way of a valve 21 and a charge line 22 to the flow line 12. The reactor is also connected by way of a line which includes valve 19 whereby a catalyst of the identical type employed in the reactor 10 may be transferred to the analog 14. The catalyst utilized in the analog 14, when spent, may be removed by way of the line including valve 20. Product from the analog reactor is transferred by way of line 23 to a product analyzer 15. The product is then transferred by way of line 24 to commingle with the product from the reactor 10 in line 13.

Data from the product analyzer 15 is then applied to a data analyzer 16. The analyzer 16 may include control means for modifying the reaction parameters in the reactor 10. The linkage 25 is provided to indicate the exercise of control by the data analyzer 16 to the reactor 10. The linkage 26 is indicative of the fact that changes in conditions in the nature of the product in the reactor 10 may be transferred to the data analyzer so that a closed loop linkage may be effective to provide control at a desired operating point. Similarly, data from the analyzer 16 may be employed to modify the conditions in the reactor analog 14 as indicated by the linkage 27.

The reactor analog 14 is controlled by a cycle control or timing unit 18 which is connected by way of linkages 18a, 18b, 18c and 18d to the valves 21 and 19, to the analog 14, and to the valve 20, respectively. In accordance with the present invention, an input or charge stock in line 12 is utilized in the reactor analog 14 for determination of the reaction rate constants as characterizes the reaction in the reactor 10. This involves a plurality of test runs. For the system 1-butene, cis-2-butene and trans-2-butene, the following method would be employed in order to evaluate the isomerization reaction in the reactor 10, to determine the reaction rates, and to control the process conditions in reactor 10 at an optimum level.

It will be assumed that the constituent $A_1$ of Equation 1 is 1-butene, the constituent $A_2$ is cis-2-butene, and constituent $A_3$ is trans-2-butene. This example will relate to the isomerization reaction among the foregoing three constituents as in a glass lined reactor such as reactor 10 or the reactor analog 14 of FIG. 2 where in both instances there is provided a pure alumina catalyst and in which the reaction temperature is maintained at 230° C.

Under the foregoing conditions, if pure cis-2-butene comprises the charge stock in line 12, then the reaction will proceed until an equilibrium condition is approached. In FIG. 1 there is plotted a reaction path 30 in the reaction plane 31 which represents the path traced by the end of the vector $\Delta_{01}$ as the reaction proceeds from a pure cis-2-butene input to the equilibrium point 32. The composition vector at the equilibrium point is identified as $\Delta^*$. Data points are taken at intervals along the reaction path 30. Measurements of time are not necessary. Data points are required sufficient to plot the path 30 in sufficient detail as to describe its course as the composition vector changes from vector $\Delta_{01}$ to $\Delta^*$. It will be convenient to refer to the components of the vector $\Delta_{01}$ and components of the vector $\Delta^*$ as follows:

$$\Delta_{01} = \begin{pmatrix} a_1 \\ a_2 \\ a_3 \end{pmatrix} = \begin{pmatrix} 0 \\ 1 \\ 0 \end{pmatrix} \begin{matrix} \ldots \text{1-butene} \\ \ldots \text{cis-2-butene} \\ \ldots \text{trans-2-butene} \end{matrix} \quad (21)$$

and $$\Delta^* = \begin{pmatrix} a_1^* \\ a_2^* \\ a_3^* \end{pmatrix} = X_0 = \begin{pmatrix} x_{10} \\ x_{20} \\ x_{30} \end{pmatrix} = \begin{pmatrix} .1436 \\ .3213 \\ .5351 \end{pmatrix} \quad (22)$$

It will be remembered that $X_0$ is the first column vector of the X matrix (15).

The purpose for obtaining data describing the path 30 is to provide sufficient information whereby a new starting composition can be determined which more nearly approximates a mixture representing a point on a straight line reaction path in composition space 31 leading to the equilibrium point 32. In FIG. 1 a first approximation for such a straight line reaction path is represented by dotted line 33. The vector $\Delta_{02}$ extending from the origin of the planar diagram to the intersection of the line 33 at the boundary is representative of a new starting composition which is introduced into the analog reactor 14 by proper proportioning of the flow through valves 21 and 28. The vector $\Delta_{02}$ may be expressed in the following terms where the charge stock for the new starting mixture comprises 76% cis-2-butene and 24% 1-butene, i.e.:

$$\Delta_{02} = \begin{pmatrix} a_{11} \\ a_{12} \\ a_{13} \end{pmatrix} = \begin{pmatrix} .24 \\ .76 \\ 0 \end{pmatrix} \quad (23)$$

Starting with the new composition $\Delta_{02}$, measurements are made as the reaction again proceeds toward equilibrium point 32 along a new path (not shown) which is more nearly a straight line path than the path 30. By successive actual test runs under control of timer 18, there will ultimately be identified a starting mixture represented by the vector $\Delta_1$ which describes a starting composition which lies on the straight line reaction path 34 leading to the equilibrium point 32. More particularly, the composition $\Delta_{02}$ is used as a new starting composition and its reaction path determined near equilibrium. Since it is near the straight line reaction path, twelve composition points given in Table I, forming the approximately straight line portion near equilibrium, were fitted to a straight line by the least square method.

*Table I*

|  | 1-butene | Cis-2-butene | Trans-2-butene |
|---|---|---|---|
|  | .1622 | .3604 | .4775 |
|  | .1776 | .3769 | .4455 |
|  | .1664 | .3595 | .4741 |
|  | .1654 | .3622 | .4724 |
|  | .1690 | .3671 | .4639 |
|  | .1603 | .3441 | .4955 |
|  | .1537 | .3471 | .4992 |
|  | .1571 | .3464 | .4965 |
|  | .1542 | .3431 | .5027 |
|  | .1521 | .3451 | .5028 |
|  | .1525 | .3408 | .5067 |
|  | .1532 | .3416 | .5052 |
| Total | 1.9237 | 4.2343 | 5.8420 |
| Average | .16031 | .35286 | .48683 |

Using the equilibrium values $$\Delta^* = X_0 = \begin{pmatrix} .1436 \\ .3213 \\ .5351 \end{pmatrix}$$

and the average values of the composition points given in Table I, there was obtained a new starting composition $$\Delta_{03} = \begin{pmatrix} .3286 \\ .6714 \\ .0000 \end{pmatrix}$$

The above process was repeated until a sufficiently accurate agreement was obtained between successive straight line extrapolation. The sequence of initial compositions used to converge on this value was

| Initial Composition | New Initial Composition |
|---|---|
| $\begin{pmatrix} .0000 \\ 1.0000 \\ .0000 \end{pmatrix}$ | $\begin{pmatrix} .240 \\ .760 \\ .000 \end{pmatrix}$ |
| $\begin{pmatrix} .240 \\ .760 \\ .000 \end{pmatrix}$ | $\begin{pmatrix} .3286 \\ .6714 \\ .0000 \end{pmatrix}$ |
| $\begin{pmatrix} .3258 \\ .6742 \\ .0000 \end{pmatrix}$ | $\begin{pmatrix} .3510 \\ .6490 \\ .0000 \end{pmatrix}$ |
| $\begin{pmatrix} .3551 \\ .6449 \\ .0000 \end{pmatrix}$ | $\begin{pmatrix} .3492 \\ .6508 \\ .0000 \end{pmatrix}$ |

The experimental points from the third and fourth initial compositions are given in Tables II and III for that part of the path near equilibrium used to obtain the new initial compositions.

Table II

|  | 1-butene | Cis-2-butene | Trans-2-butene |
|---|---|---|---|
|  | .2289 | .4606 | .3105 |
|  | .2362 | .4738 | .2900 |
|  | .1989 | .4118 | .3894 |
|  | .1895 | .3915 | .4190 |
|  | .1751 | .3678 | .4571 |
|  | .1801 | .3815 | .4384 |
|  | .1557 | .3478 | .4965 |
|  | .1644 | .3589 | .4767 |
|  | .1577 | .3423 | .5000 |
|  | .1583 | .3395 | .5021 |
|  | .1509 | .3324 | .5167 |
|  | .1551 | .3290 | .5159 |
|  | .1534 | .3314 | .5152 |
| Total | 2.3042 | 4.8683 | 5.8275 |
| Average | .17725 | .37448 | .44827 |

Table III

|  | 1-butene | Cis-2-butene | Trans-2-butene |
|---|---|---|---|
|  | .2974 | .5689 | .1337 |
|  | .2917 | .5642 | .1447 |
|  | .2800 | .5386 | .1814 |
|  | .2659 | .5202 | .2139 |
|  | .2577 | .5043 | .2380 |
|  | .2444 | .4758 | .2798 |
|  | .2311 | .4579 | .3110 |
|  | .2075 | .4281 | .3644 |
|  | .1938 | .4031 | .4031 |
|  | .1714 | .3618 | .4668 |
| Total | 2.4409 | 4.8229 | 2.7366 |
| Average | .2441 | .4823 | .2737 |

Figure 3:
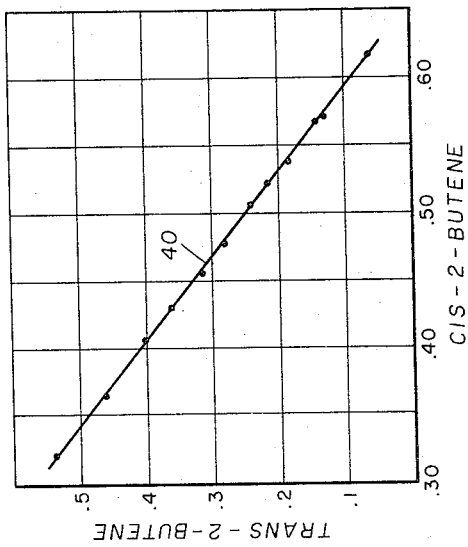
FIG. 3 is a plot of reaction rates along one straight line reaction path.

All experimental points for the last initial composition are plotted in FIG. 3 with the least square line 40 used to obtain the final values of $$\Delta_1 = \begin{pmatrix} .3492 \\ .6508 \\ 0 \end{pmatrix}$$

Having identified the constituents representative of the vector $\Delta_1$, the vector $X_1$ of the X matrix (15) may be computed by subtracting the equilibrium vector $X_0$ from vector $\Delta_1$. More particularly $$X_1 = \begin{pmatrix} x_{11} \\ x_{21} \\ x_{31} \end{pmatrix} = \Delta_1 - X_0 = \begin{pmatrix} .3492 \\ .6508 \\ 0 \end{pmatrix} - \begin{pmatrix} .1436 \\ .3213 \\ .5351 \end{pmatrix} = \begin{pmatrix} .2056 \\ .3295 \\ -.5351 \end{pmatrix} \quad (24)$$

To recapitulate briefly, having identified the first reaction path 30, the new starting mixture $\Delta_{02}$ was identified by extrapolating the curve 30 near the equilibrium point 32 back to the left boundary of the reaction space 31. A new reaction path was then determined from an experimental run in the analog reactor 14. The new path was then extrapolated back to the boundary of the reaction space. By a series of such tests there ultimately was identified a composition $\Delta_1$ representative of a point on reaction path 34 which has no curvature in it in reaction space but merely is represented by a straight line.

The extrapolation for identifying the successive starting mixtures $\Delta_{01} \ldots \Delta_1$ may be graphically carried out as illustrated in FIG. 1 or may be accomplished through computing techniques such as the least squares fitting of the curve segment in the region of equilibrium, such procedure being well understood by those skilled in the art.

Referring again to the matrix X (15), the procedure above described is for the purpose of identifying the relative amounts of constituents which form a matrix X wherein the vectors forming the matrix are orthogonal. The first vector $X_0$ of the matrix X (15) represents the relative proportions of constituents at the equilibrium point 32. The second vector $X_1$ of the matrix X (15) is the numerical difference between the constituents forming the vector $\Delta_1$ and the equilibrium vector $\Delta^*$.

Now that the first two vectors $X_0$ and $X_1$ of the matrix X (15) have been evaluated, the third vector $X_2$ will be identified. For the purpose of this description the third vector $X_2$ will be considered to be orthogonal if it satisfies the following conditions:

$$X_0^T D^{-1} X_2 = 0$$
$$X_1^T D^{-1} X_2 = 0 \quad (25)$$

Equation 25 involves an equilibrium weighting function and may be expressed in the following form to indicate operations for determining $X_2$:

$$\Delta_2' = \Delta_2'' - \left(\frac{X_0^T D^{-1} \Delta_2''}{X_0^T D^{-1} X_0}\right) X_0 - \left(\frac{X_1^T D^{-1} \Delta_2''}{X_1^T D^{-1} X_1}\right) X_1 \quad (26)$$

where $\Delta_2''$ is an arbitrary vector representing a new starting mixture of components $A_1$, $A_2$ and $A_3$,
$X_0$ is the first column vector of the matrix X,
$X_0^T$ is the transpose of $X_0$,
$X_1$ is the second column vector of the matrix X.

Once $\Delta_2'$ is determined, then $\Delta_2$ is determined from the following relationship:

$$\Delta_2 = \phi \Delta_2' + X_0 \quad (27)$$

where $\phi$ is chosen to make all components of $\phi \Delta_2' + X_0$ positive with the smallest equal to zero and the sum of the remaining components equal to 1.

From $\Delta_2$ the third column vector is determined as follows:

$$X_2 = \begin{pmatrix} x_{31} \\ x_{32} \\ x_{33} \end{pmatrix} = \Delta_2 - X_0 = \begin{pmatrix} -.1436 \\ +.1724 \\ -.0288 \end{pmatrix} \quad (28)$$

The foregoing completes the determination of the matrix X (15) which is the characteristic or eigenvector matrix for the system of FIG. 1. Numerically, for this system the characteristic matrix X has the following values:

$$X = \begin{pmatrix} .1436 & .2056 & -.1436 \\ .3213 & .3295 & .1724 \\ .5351 & -.5351 & -.0288 \end{pmatrix} \quad (29)$$

*Determination of the characteristic root ratios or $\Lambda'$ matrix*

The inverse matrix $X^{-1}$ (17) transforms the composition $\Delta$ in the A system to compositions $b$ in the B system for a highly curved path in the reaction plane such as the path 30 from pure cis-2-butene. In the Table IV are listed various different compositions $\Delta_{(t)}$ along the reaction path for cis-2-butene where the measurements were made at different times $t_0, t_1 \ldots t_7$. However, the values of the time parameters are not necessary for determining the $\Lambda'$ matrix.

*Table IV—Butene isomerization*

(The composition $b_{(t)}$ determined from the experimentally observed compositions $\Delta_{(t)}$ from an initial composition of pure cis-2-butene.)

| t | $\Delta_{(t)}$ | $b_{(t)}$ |
|---|---|---|
| $t_0$ | .0000<br>1.0000<br>.0000 | 1.0000<br>0.8784<br>2.2579 |
| $t_1$ | .0387<br>.9191<br>.0422 | 1.0000<br>0.8187<br>1.9028 |
| $t_2$ | .0543<br>.8897<br>.0560 | 1.0000<br>0.8001<br>1.7677 |
| $t_3$ | .0703<br>.8480<br>.0820 | 1.0000<br>0.7605<br>1.6016 |
| $t_4$ | .0854<br>.8177<br>.0969 | 1.0000<br>0.7400<br>1.4650 |
| $t_5$ | .1396<br>.6603<br>.2001 | 1.0000<br>0.5798<br>0.8582 |
| $t_6$ | .1410<br>.6480<br>.2100 | 1.0000<br>0.5623<br>0.8223 |
| $t_7$ | .1470<br>.6360<br>.2180 | 1.0000<br>0.5522<br>0.7681 |
| $t_8$ | .1620<br>.5230<br>.3150 | 1.0000<br>0.3883<br>0.4279 |

Figure 4:
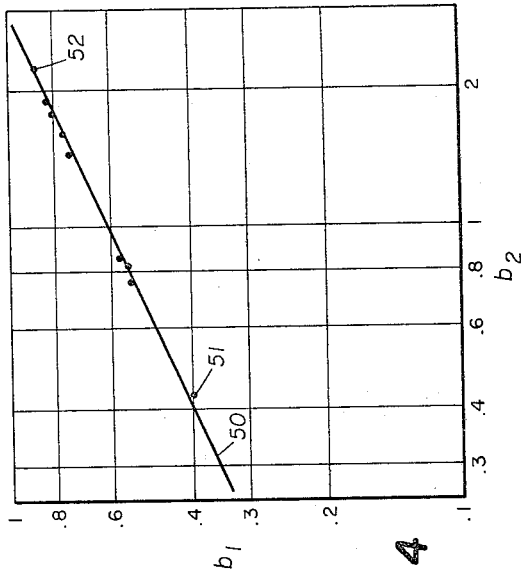
FIG. 4 is a plot of time-dependent data along a curved reaction path having representative amounts of the three constituents of the diagram of FIG. 1 in a starting mixture.

The values of $\Delta_{(t)}$ of Table IV above were measured at a plurality of different times along the reaction path 30. The values of each such mixture were then converted by the use of Equation 17 to the $b_{(t)}$ values of Table IV. It has been found that the logarithm of any one of the three constituents in the mixture as a function of time is a linear function of the logarithm of any of the other of the three constituents. More particularly, the values for cis-2-butene ($b_1$) and trans-2-butene ($b_2$) are plotted in FIG. 4. The point 51 on line 50 corresponds with the last set of values of $b_{(t)}$ of Table IV. The point 52 corresponds with the first set of values of $b_{(t)}$ in Table IV. The slope of line 50 is equal to the ratio $\lambda_1 : \lambda_2$ and in this case has a value of 0.4769, which provides all the information necessary for the $\Lambda'$ matrix (16). More particularly, $\Lambda'$ matrix numerically is as follows:

$$\Lambda' = \begin{pmatrix} 0 & 0 & 0 \\ 0 & -0.4769 & 0 \\ 0 & 0 & -1 \end{pmatrix}$$

*Determination of K' matrix*

To this point, for the three-component system under consideration, two sets of experimental data have been obtained.

(1) Two straight line reaction paths leading to equilibrium have been identified. This involved one series of tests whereby closer and closer approximations to a straight line leading to equilibrium were obtained and ultimately a straight line reaction path was identified as was the equilibrium point. This information and the orthogonal relationships involved were employed to determine or identify a second straight line reaction path. Thus, the vectors $X_0$, $X_1$ and $X_2$ of the X matrix (15) were all determined from the first set of test data.

(2) A second set of data involved obtaining the relative amounts of constituents at different points along one curved reaction path. This involved operations illustrated by the graph of FIG. 4 involving concentrations of two of the three constituents plotted on a log-log grid. The resultant straight line has a slope that is proportional to the ratio of the reaction rates along the curved path and thus provides the necessary information for the $\Lambda'$ matrix.

The foregoing two sets of experimental data provide all the necessary information for the understanding of the three-component reaction system under consideration. Test data may be supplied from the product analyzer 15 to the control unit 16 where the data is stored and is utilized for the control of the catalytic reactor 10 and/or the catalytic reactor analog 14.

While it may be desirable to fully evaluate the reaction rate matrix K, this is not necessary for control purposes. A full understanding and adequate basis is provided for all control purposes through the evaluation of a relative rate constant matrix K'. All of the data necessary for determining this matrix is available from the X matrix and the $\Lambda'$ matrix above described.

More particularly, as will be recalled from Equation 14, it is necessary to obtain a $X^{-1}$ matrix in order to carry out a complete evaluation of the relative rate constant matrix K'. For this purpose there has been provided a system which may be included in the control unit 16 and is of the type illustrated in FIGS. 5–7.

Figure 6:
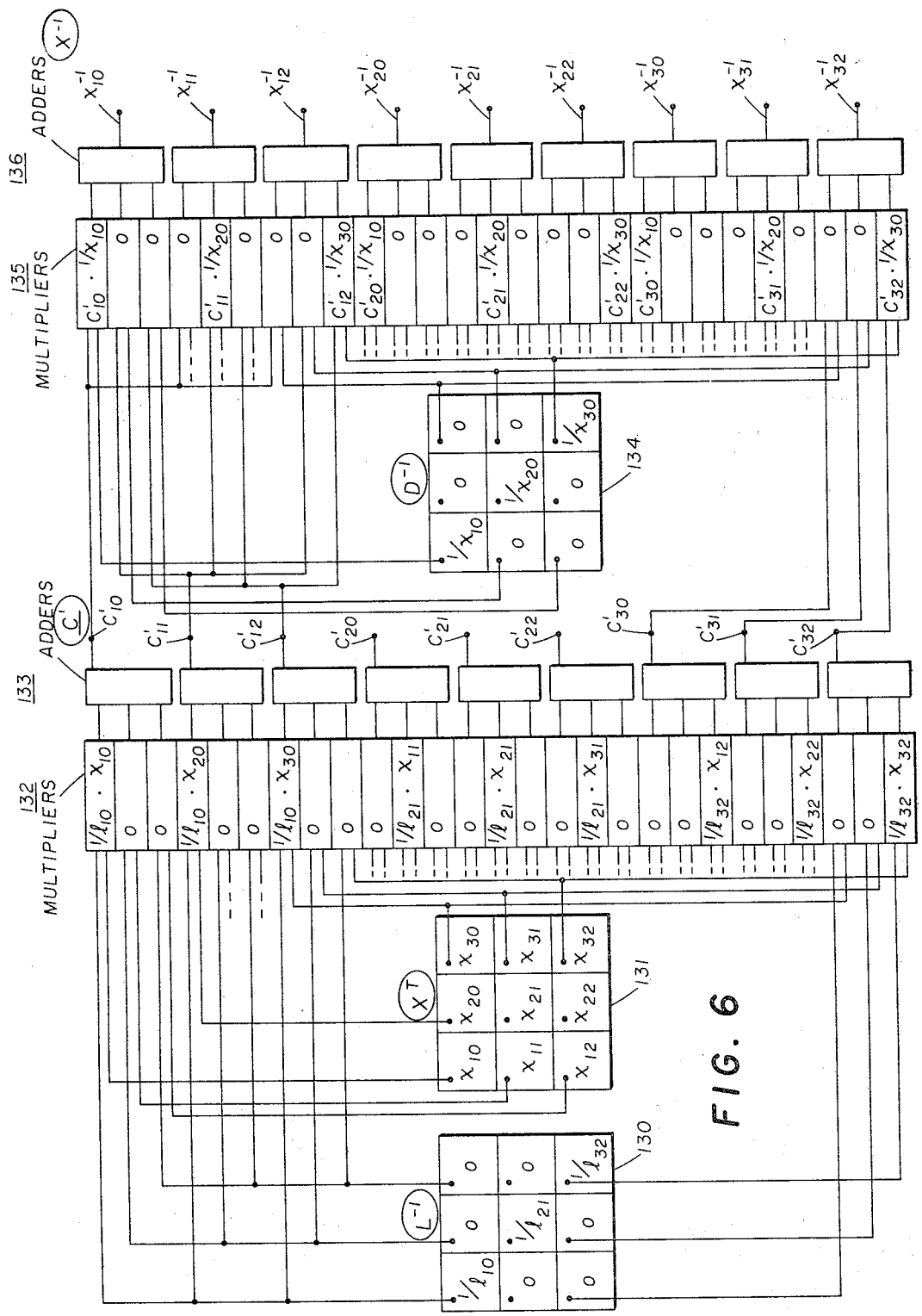
FIG. 6 illustrates a system for deriving matrix$^{-1}$ employed for evaluating an inverse X matrix employed for obtaining a rate constant matrix.
Figure 7:
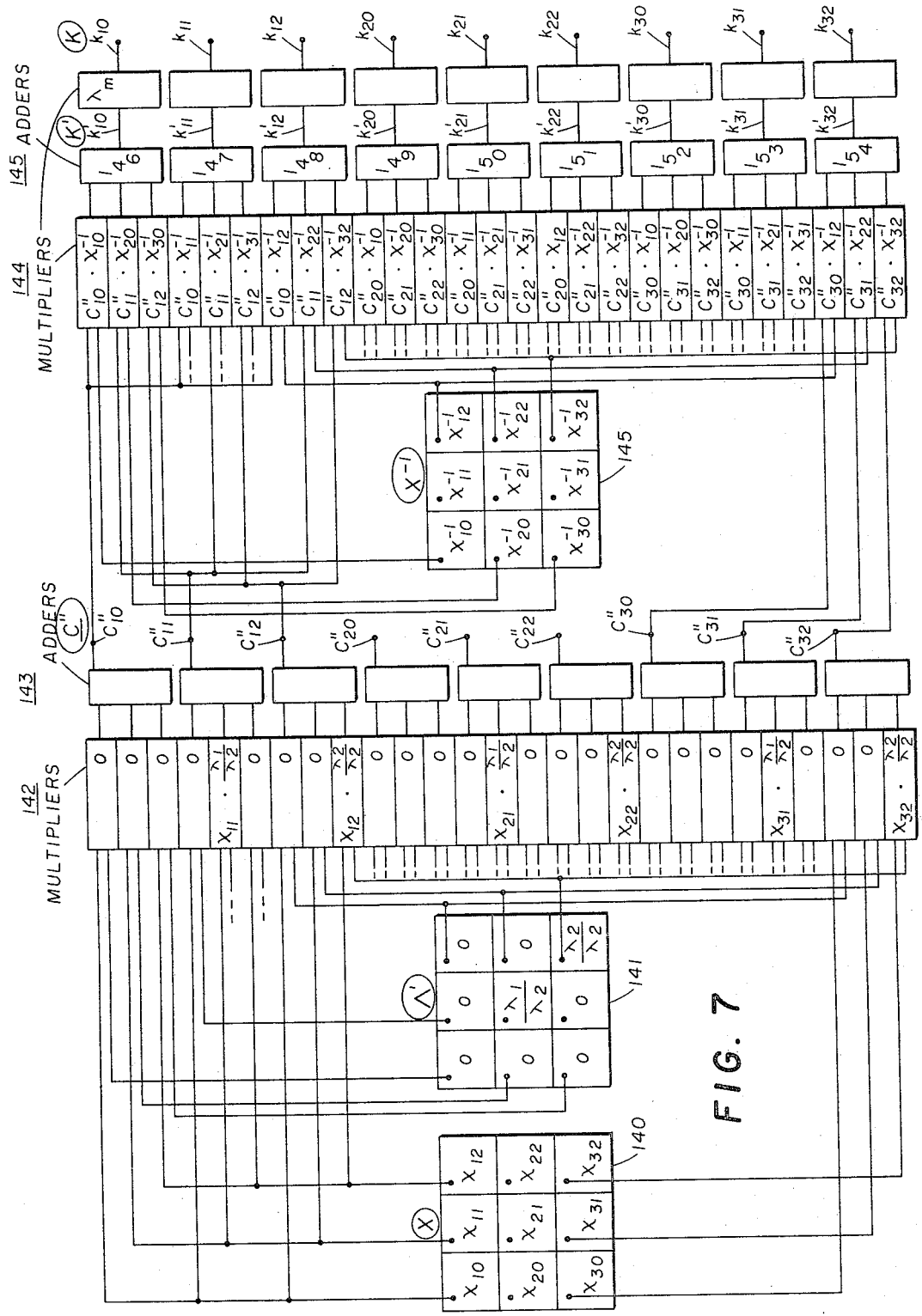
FIG. 7 illustrates a system employed for determining rate constants in the system of FIG. 1.

FIG. 7 shows the operations indicated in Equation 14 where the product of the X matrix, the $\Lambda'$ matrix and the $X^{-1}$ matrix is formed. When this is done, the relative rate constant matrix K' appears at the output terminals of the last stage of FIG. 7. The systems of FIGS. 5 and 6 are similar to that of FIG. 7 but are employed for carrying out the necessary operations to determine the $X^{-1}$ matrix of FIG. 7.

*Determination of matrix L*

Figure 5:
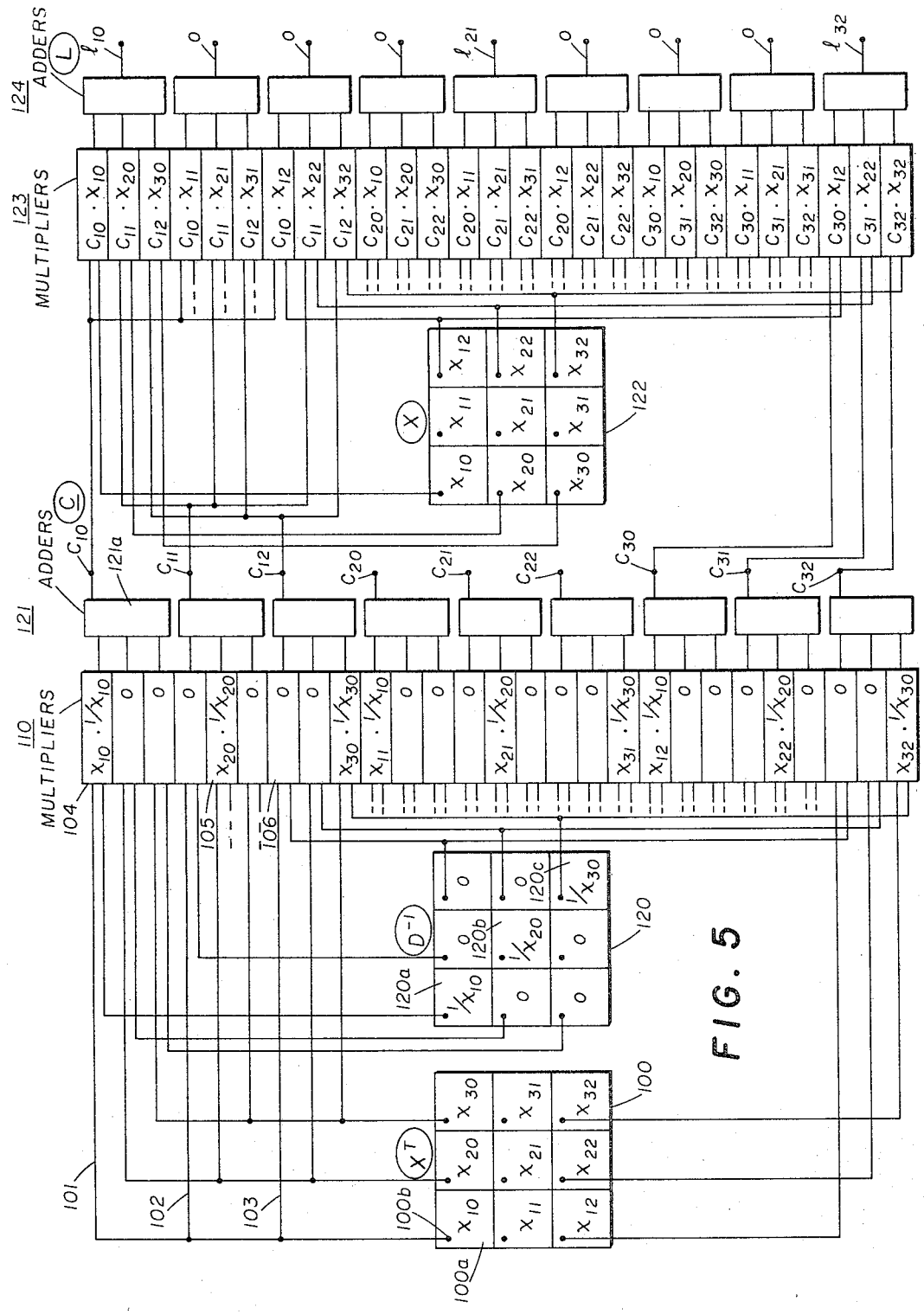
FIG. 5 illustrates a system for deriving an L matrix employed for evaluating an inverse X matrix.

Referring now to FIG. 5, there is indicated an analog system for carrying out the necessary functions to determine the L matrix (20), the inverse of which is to be used as indicated in Equation 17 in determining the $X^{-1}$ matrix. More particularly, in FIG. 5 there is provided a plurality of sources in the unit 100 which have outputs in number corresponding to the elements of the $X^T$ matrix (18). More particularly, in the upper left hand unit 100a voltage is produced at terminal 100b which is representative in magnitude of the concentration of 1-butene at the equilibrium point 32 of FIG. 1. This voltage is then applied by way of channels 101, 102 and 103 to one input of each of multipliers 104, 105 and 106. In a similar manner voltages from the remaining sources in unit 100 are applied by channels, some of which are shown completely in FIG. 5 and some of which have been omitted for the purpose of clarity, to multipliers in the multiplier bank 110.

A second unit 120 similarly includes a plurality of subunits from each of which there is derived a voltage representative of a $D^{-1}$ matrix (19). The $D^{-1}$ matrix (19)

is characterized by voltages from the units along the diagonal of the matrix unit 120 respectively representative of the inverse of the $X_0$ vector of the X matrix (15). More particularly, the voltage in the upper left hand unit 120a is proportional to the reciprocal of the magnitude of the 1-butene component in the mixture of FIG. 1 and at equilibrium point 32. The voltage from unit 120b is proportional to the reciprocal of the concentration of cis-2-butene at the equilibrium point. The voltage from the third unit 120c is proportional to the inverse of the concentration of trans-2-butene at the equilibrium point. The latter voltages are then applied to the respective multipliers of the bank 110 in order to perform the matrix multiplication $(X^T \times D^{-1})$. Matrix multiplication is well-known and understood wherein the product of two square matrix units such as in units 100 and 120 is another square matrix. More particularly, the first element of the first vector of the product matrix C, FIG. 5, is equal to the sum of the products of multiplication of voltages from the first column of the $X^T$ matrix unit 100 by voltages from the first row of the $D^{-1}$ matrix unit 120. Thus, the multiplier 104 provides the product $$\left(x_{10} \times \frac{1}{x_{10}}\right)$$

Since voltages in the second and third elements of the first row of the $D^{-1}$ matrix unit 120 are zero, then the voltages applied to the adder 121a are respectively 1, 0, and 0. Thus, the first element of the first column in the product matrix C, namely, the element $c_{10}$, has a voltage representation equal to 1. The second element $c_{11}$ of the first column of the product matrix C is then formed from the product of the first column of the $X^T$ matrix unit 100 times the second row of the $D^{-1}$ matrix 120. The third element $c_{12}$ of the first column of the product matrix C is formed by the product of the first column of the $X^T$ matrix unit 100 times the third row of the $D^{-1}$ matrix unit 120. Thus, all the multiplication operations involved are indicated in the multiplier unit 110 even though some involve multiplication of a zero so that the output will be zero.

There is thus formed a square voltage matrix C at the output of the adder unit bank 121 which is then multiplied by the voltages from the X matrix unit 122 in the same maner as described in connection with matrices $X^T$ and $D^{-1}$ stored in units 100 and 120. The multiplier bank 123 and the adder bank 124 operate in conjunction with the C-matrix and X-matrix voltages to produce output voltages representative of an L matrix which is to be employed in the unit of FIG. 6.

Determination of matrix $X^{-1}$

The values of voltages appearing at output terminals in bank 124 are utilized in forming diagonal matrix $L^{-1}$ of FIG. 6. More particularly, voltages representative of $$\frac{1}{l_{10}}, \frac{1}{l_{21}}, \frac{1}{l_{32}}$$

are stored in the diagonal units in the unit 130. The voltages from the $L^{-1}$ unit 130 are then multiplied by the voltages from the $X^T$ unit 131. The product matrix voltages C' are then available at the outputs of the bank of adders 133 which in turn are supplied by the multiplier bank 132. The C' matrix voltages at the output of the adder bank 133 are then multiplied by the voltages from matrix $D^{-1}$ unit 134. A matrix of product voltages thus available at the output of the adder bank 136 as fed by the multiplier bank 135 is the matrix $X^{-1}$ of Equation 17. The voltages or functions available at the output of the adders 136 are then utilized in the matrix $X^{-1}$ unit of FIG. 7.

Determination of matrix K'

Referring now to FIG. 7, a first matrix unit 140 is representative of the matrix X (15) above-identified from the straight line reaction paths leading to the equilibrium point in FIG. 1. A second unit 141 provides output voltages along the diagonal thereof representative of the matrix $\wedge'$ (16) which is the ratio of reaction rates along one curved path illustrated in FIG. 4. More particularly, the first voltage in the diagonal of the matrix $\wedge'$ is zero. The second voltage along the diagonal is proportional to the slope of the line 50 of FIG. 4. The third voltage of the diagonal is equal to 1, i.e., the ratio of $\lambda_2/\lambda_2$. The multiplier bank 142 and the adder bank 143 are then employed for providing a product matrix, a square matrix designated by the legend C''. The voltages of the C'' matrix, $c''_{10}-c''_{32}$, appear at the output terminals of the adder bank 143. They are also applied to the designated input terminals on the multiplier bank 144 where the matrix $X^{-1}$ voltages from unit 145 are connected. The multiplier bank 144 then feeds the output adder bank 145. The voltages appearing at the output of the adder bank 145 are then proportional to the relative reaction rate matrix K'. That is, the relative values of the rate constants are proportional to the voltages appearing at the outputs of adders in bank 145.

In the actual numerical example above employed, the following values were obtained:

$$K' = X \wedge' X^{-1} = \begin{pmatrix} .1436 & .2056 & -.1436 \\ .3213 & .3295 & .1724 \\ .5351 & -.5351 & -.0288 \end{pmatrix} \begin{pmatrix} .0000 & .0000 & .0000 \\ .0000 & -.4769 & .0000 \\ .0000 & .0000 & -1.0000 \end{pmatrix} \begin{pmatrix} 1.0000 & 1.0000 & 1.0000 \\ 1.2265 & 0.8784 & -0.8566 \\ -4.2077 & 2.2579 & -0.2264 \end{pmatrix} \quad (30)$$

Thus, voltages having the following numerical values were produced at the output of adders 145, FIG. 7:

$$K' = \begin{pmatrix} -.7255 & .2381 & .0515 \\ .5327 & -.5273 & .1736 \\ .1918 & .2892 & -.2251 \end{pmatrix} \quad (31)$$

A more understandable rate matrix K'' was then formed by dividing each element of the K' matrix of the above Equation 31 by the number 0.0515, the smallest relative reaction rate constant in the K' matrix. Thus, the relative rate constant matrix K'' was as follows:

$$K'' = \begin{pmatrix} -14.068 & 4.623 & 1.000 \\ 10.344 & -10.239 & 3.371 \\ 3.724 & 5.616 & -4.371 \end{pmatrix} \quad (32)$$

Hence, for the isomerization of butenes over pure alumina catalysts at 230° C. in an all glass flow reactor, the relative rate constants were found to be as follows:

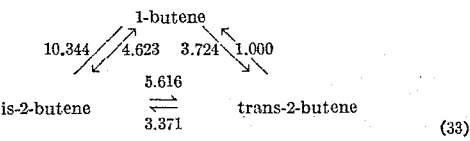

(33)

The values obtained from the foregoing measurements and computational procedures yield the relative rate constants for the system of FIG. 1 under specified process conditions. It will be remembered that the values thus obtained are independent of measurement of time, the relative rate constant matrix K'' found in the set (32) being obtained without an explicit consideration of the reaction time. The values were obtained from a knowledge of the various compositions through which the initial composition passed on the way to equilibrium without regard to the time at which the various compositions occurred.

The actual values found in the K' matrix in set (31) are represented physically by the voltages appearing at the output of the adders 145 of FIG. 7. As indicated in Equation 14, the absolute value of the reaction rate matrix K is equal to the relative rate constant matrix K' multiplied by a constant or scaler factor $\lambda_2$. The constant $\lambda_2$ can readily be obtained by making time measurements of variations in concentrations of the various constituents along a path with a starting mixture having representative amounts of all of fictitious species $B_2$. A starting mixture other than a mixture lying along path 34 of FIG. 1 would be satisfactory for evaluating $\lambda_2$. Paths immediately adjacent path 34 would not provide a measure of $\lambda_2$ nearly so directly as a starting mixture lying along the second straight line path such as starting mixture $\Delta_2$, FIG. 1. Starting mixture $\Delta_2$ would thus be the preferred starting mixture for determination of $\lambda_2$. The value for $\lambda_2$ thus obtained is employed as the multiplying factor in each of the multiplier units connected to the output of the adders 145, FIG. 7. By multiplying the voltages appearing at the outputs of the adders 146–154, there is produced a matrix of voltages $k_{10}-k_{32}$ which represents the absolute values of the rate constant matrix K, which is a final solution to Equation 14.

However, it will be recognized that the relative rate constant matrix K'' in set (32) and as diagrammatically portrayed in set (33) is as fully descriptive of the rate processes as is necessary for control purposes.

With voltages now available which are representative of the K' matrix as at the output of the adders 145, the control unit 16 may then be made responsive to such rate constant matrix, i.e., to the voltages available at the output of the adders 145, FIG. 7. The control unit 16 may be programmed or have built into it a set of criteria for introducing to the reactor 10 changes in process conditions as diagrammatically indicated by the linkage 25 to modify the reaction. For example, referring to the rate constant diagram, Equation 33, it may be desirable to modify the reaction conditions so that the reaction from 1-butene to cis-2-butene may be enhanced relative to the reverse reaction, or to the interactions between 1-butene and trans-2-butene, or to the interactions between cis-2-butene and trans-2-butene. Changes in one or more of the reactor parameters would be made step-wise in order to approach a predetermined or preset standard of performance of a given reaction system. Such optimization procedures are well-known in the art. For example, in a paper entitled "Optimizers: Their Structure" by R. F. Wheeling, a coworker of applicant, Communications of the Association of Computing Machinery, volume 3, Number 12, December, 1960, pages 632–638, there is described a procedure for optimization which may be followed in connection with operation of reactor 10 in accordance with the present invention. Automatic controls for reactor systems, such as illustrated in FIG. 2, are well-known. However, the insight to the kinetics of the reaction itself, as is necessary to provide a proper basis for exercise of control over the reaction system, has not heretofore been available. Production of the physical representations of the characteristic vectors and the characteristic roots of said vectors as represented by the X matrix and $\wedge'$ matrix represents a substantial advance in the art as to an understanding of complex reaction systems.

The analysis as above described is based upon a monomolecular reaction. More complex reactions can, to a first approximation, be approached reliably on a basis of a monomolecular system. It is not necessary to compute nor produce physical representations of the rate constant matrix as appears at the output terminals of the system of FIG. 7. A representation of the orientation of the straight line reaction paths in itself may provide sufficient information for establishment of a reliable control function.

More particularly, in the three-component system illustrated in FIG. 1, after first establishing the equilibrium point 32 and the straight line reaction path 34 and the second straight line reaction path leading from the starting mixture $\Delta_2$ to equilibrium, the reaction path for any starting mixture within the reaction plane may then be readily determined or predicted by use of the relatively simple formula $Y=pX^r$ of Equation 5. In this equation X may be taken to represent the line 34, a first axis in a two-dimensional coordinate system. Y corresponds with the second straight line reaction path forming the second coordinate of the two coordinate system. Any starting mixture of the three components 1-butene, cis-2-butene and trans-2-butene will result in a reaction which proceeds towards equilibrium in accordance with Equation 5. Thus, great understanding of the reaction process can be had by merely identifying the straight line reaction paths themselves and utilizing the same for control purposes if desired. From the foregoing it will be apparent that there is utility in, (a) The establishment of a physical representation of the X matrix, (b) The establishment of physical representations of both the X matrix and the $\wedge'$ matrix, (c) The establishment of physical representations of the rate constant matrix either relative or in absolute form.

The physical representations above referred to may be in the form of voltages as described in connection with the description of FIGS. 5–7. The voltages may be analog voltages, that is, voltages in which the magnitude thereof represents the numerical value of concentration or the like. It will be recognized, however, that the system of FIGS. 5–7 may be entirely digital in form. However, for the purpose of illustration the analog system has been presumed to be the form of the systems of FIGS. 5–7. In order to further illustrate the formation of the voltages which represent the various matrices there has been illustrated in FIG. 8 an embodiment of a system in which a product analyzer is employed to provide voltages to the control unit 16 in which the various matrices are formed. Thus, a system such as illustrated in FIG. 8 may be considered to form portions of the analyzer 15 and the control 16 as well as a linkage therebetween.

The system of FIG. 8 illustrates an embodiment of a system for actually forming the voltages required for the X matrix of FIGS. 5 and 7. Included is a fairly detailed illustration of certain components of the product analyzer 15 of FIG. 2 wherein the output from the catalytic reactor analog 14 flows through the product analyzer 15 by way of flow line 23.

The analyzer system is of the gas chromatographic type. A first analyzer channel includes a valve 200 to which the line 23 is connected. The valve, in a first position, directs flow from line 23 through the product analyzer 15 and thence, as illustrated in FIG. 2, back to the output product line 13. For purpose of illustration, the analyzer has been shown as a multichannel system including channels 15a, 15b and 15c. The valve 200 in a second position diverts flow from the line 23 through a chromatographic column 201 in channel 15a. The gas chromatograph may be of a type well-known to those skilled in the art in which a multicomponent sample of hydrocarbons in gaseous phase pass through a separating column along with a suitable carrier gas. In such a system the flow in channel 202 is characterized by the various constituents being separated by discrete time intervals so that both quantitative and qualitative analysis of the input mixture is accomplished by measurement of amounts of each component and the identification of such components. A system of the type illustrated in FIG. 8 is more fully described in British Patent No. 872,260, published July 5, 1961. Such system includes apparatus for chromatographic analysis of a continuous chemical stream such as that involved in the example above-described wherein 1-butene, trans-2-butene and cis-2- butene may comprise an input mixture. While the construction and operation of a gas chromatograph are well-known, briefly it may be stated that the column 201 is packed with a material through which the input gas passes. The absorption forces on the solid material are different for the various constituents of the mixture. As a result, the components of the input stream travel through the column at different characteristic relative rates. The 1-butene component will reach the output flow line 202 prior to trans-2-butene or cis-2-butene, the latter two components arriving in discrete "bunches" in the order named. As illustrated, a second flow line 204 is provided through which a carrier gas such as helium flows and is commingled in the line 205 leading from valve 200. The carrier gas also flows by way of flow line 206 to a reference cell 207. The output gas from the column 201 flows by way of line 202 to a second sample cell 208. Cells 207 and 208 both may include a resistive element which is a thermally dependent unit. The unit 208a varies in resistance in dependence upon the thermal conductivity of the gaseous atmosphere in the cell 208. Similarly, the unit 207a varies in resistivity in dependence upon the thermal conductivity of the gaseous atmosphere in the cell 207. The elements 207a and 208a form adjacent arms of a Wheatstone Bridge having arms 209 and 210. A source 211 serves to energize the bridge. Any unbalance voltage occurring by reason of different resistivity of elements 207a and 208a will appear across the output diagnoal and thus appears across the load resistance 212. The latter voltage is then applied to a recorder 213. Recorder chart 214 is driven as a function of time from a motor 215 so that its length is representative of time. As illustrated, it is calibrated in terms of minutes elapsing from time 0. The time of appearance and the amount of each component will be recorded on the chart 124. Three selectively operated channels interconnect the diagonal 212 and recorder 213. The system illustrated may be expanded to accommodate more complex mixtures but has been simplified for operation in a system having only the three components or constituents of the mixture in the input line 23. The separate circuits are provided in order to store quantities representative of amounts of each constituent in a given sample. Three circuits are selectively completed under the control of the timer 18. The timer 18 may be actuated under the control of a constant speed motor 215 which serves to drive the chart 214 in recorder 213. The timer 18 is linked to a switch 220 by way of the linkage 221 to close a circuit across the output diagonal of the bridge network while the first component, 1-butene, flows from the column 201. The resultant voltage peak 330 is thus recorded on the recorder 213, the voltage being tapped from a resistor 222 and applied to the recorder by way of channel 223. In addition to applying the voltage to the recorder 213, it is also applied by way of an amplifier 225 and a rectifier 226 to a condenser 227. The condenser 227 is charged by way of the diode 226. The charge is stored until discharged as by closure of a shorting switch 227a which may be under control of timer 18. Thus, upon closure of switch 220, there is stored on condenser 227 a voltage charge representative of the magnitude of the peak 221. Amplifier 225 may be so adjusted as to amplification as to provide system calibration compensation as well as integration of curve 300 so that the voltage on condenser 227 is proportional to the amount of 1-butene passing through the cell 208. Thereafter switches 230 and 231 are successively closed so that the waveforms 301 and 302 are recorded on recorder 213 as representative of trans-2-butene and cis-2-butene, respectively. At the same time voltages are stored on condensers 237 and 238 which are representative of the quantity of trans-2-butene and cis-2-butene, respectively, in the gas flowing through the cell 208. The voltages across condensers 227, 237 and 238 may be employed as the operating voltages $x_{10}$, $x_{20}$ and $x_{30}$ in the X matrix if the valve 200 is opened for flow through the analyzing system when the reaction as illustrated in the reaction triangle of FIG. 1 has proceeded to the equilibrium point 32. Timer 18 serves to cycle valve 200 to introduce measured amounts of the product in line 23 into the analyzer 15.

By running a series of analyses of the foregoing type under control of timer 18, reaction paths of interest in the reaction system of FIG. 1 may be plotted or representations thereof stored. The valve 200 actuated under the control of timer 18 is a precision valve so that a measured amount of the input sample will be passed to the analyzing system. The analyzer is maintained under proper conditions as to the temperature and pressure so that output readings for successive runs may be directly compared.

After having established the first vector ($x_{10}$, $x_{20}$, $x_{30}$) of the X matrix, the second vector ($x_{11}$, $x_{21}$, $x_{31}$) may then be formed by a similar operation through the use of a second analytical channel 15b. It will be understood that a single analytical channel may be employed if the stream 23 is periodically sampled and the samples retained for successive runs in the column 201 or if the reaction time leading from a given starting mixture to equilibrium is of sufficient length to permit successive runs in the chromatographic system. In one system a typical operation for the analysis of a mixture including 1-butene, trans-2-butene and cis-2-butene requires runs of at least ten to fifteen minutes before the last of the three constituents appeared at the output of the column 201. In such system the length of the column was 20 feet, the temperature was 30° C., the valve such as the valve 200 was open to permit one milliliter of sample to pass to the analyzing system. The flow rate through this system was 70 milliliters per minute.

Modifications of the various parameters in the system may be made to carry out the necessary operations more expeditiously or more accurately as conditions require. However, if a second channel 15a is employed, output voltages may be produced which are then stored on condensers 250, 251 and 252 which are representative of a starting mixture $\Delta_1$, i.e., the starting mixture on the first straight line reaction path in FIG. 1. The latter voltages are stored and retained after having run sufficient analyses under the control of unit 18 to identify the starting mixture for the first straight line reaction path 34. The voltages stored on condensers 250, 251 and 252 are employed to develop three voltages representative of the second vector of the X matrix, i.e., ($x_{11}$, $x_{21}$ and $x_{31}$). The voltage $x_{11}$ is the voltage on condenser 250 minus the voltage on condenser 227. In order to form the voltage $x_{11}$, the voltage on condenser 227 is applied to an inverter 255. The inverter output is then added to the voltage from condenser 250. The conductor 256, on which the voltage difference appears, is connected to the terminal on the $x_{11}$ source of the X matrix. In a similar manner the voltages on channels 257 and 258 are formed to represent the elements $x_{21}$ and $x_{31}$ of the X matrix.

A subsequent set of runs may then be undertaken through use of channel 15b to form voltages representative of the elements $x_{12}$, $x_{22}$ and $x_{32}$ of the X matrix.

The foregoing is illustrative of the manner in which the timer 18 may control the product analyzer 15 for the analysis of the output of the catalytic reactor analog in order to provide the necessary data for the control unit 16. It is to be understood that a more complete description of the precise manner in which a timer unit controls the operation of the system is found in the above-identified British Patent No. 872,260, 1961. The system illustrated in FIG. 2 may involve analysis of the product in line 23 by wet chemical methods or any other means. However, as shown in FIG. 8, the analysis can be performed completely automatically under the control of timer 18. The control unit 16 may then be preset to be responsive to (a) the X matrix, (b) the product of the X matrix and the $\wedge'$ matrix of FIG. 7, (c) the K' matrix, or (d) the K matrix. In either case a new and unique set of control functions is provided for control of operation of the reactor 10 or the reactor analog 14.

The relatively simple three component isomerization system of 1-butene, cis-2-butene and trans-2-butene over an alumina catalyst was chosen because it is relatively uncomplicated by side reactions and yet is sufficiently complex to have resisted all attempts by others to resolve the true nature of its kinetics. The method of the present invention can be applied to multi-component systems involving more than three parameters. In such cases understanding of reaction kinetics is generally more obscure. The present invention provides a new tool for understanding and controlling the same. Where the number of constituents in a given mixture is $n$, then $n-2$ sets of experimental data are necessary to define the required number of straight line reaction paths. The invention is of general applicability regardless of the number of constituents involved in a given system. Three constituents have been employed in the present description for the purpose of illustration since they can be visualized in a two-dimensional plot as in FIG. 1. It is also possible to plot a four component system even though it is difficult to follow the reaction paths in three dimensions. However, it is impossible to portray visually the reaction paths in a system of dimensions greater than involved with four constituents. As indicated by Equation 3, the method is applicable to $n$-components and is not limited in that regard. Furthermore, the method is applicable to systems in which irreversible reactions are involved since in the latter case the reaction rate constant in one direction would be of finite value and the reaction rate constant in the other direction would be zero.

The systems of FIGS. 2 and 8 have been illustrated in diagrammatic form in order to describe a typical setting for the present invention. However, it will readily be understood that system details are generally understood by those skilled in the art. For more complete details as to features of the system where the mechanics of data sampling and closed loop control are involved, the following disclosures may be referred to as representative of systems herein referred to.

For a further understanding as to the structure and operation of the valve 209, FIG. 8, reference may be had to an article entitled, "A Fast Sampling Valve for Gas Chromatography," by F. W. Karasek and B. O. Ayers, ISA Journal, March, 1960, vol. 7, No. 3, pages 70 and 71. Use of a system embodying such a valve for closed loop fractionator control is described in an article entitled, "High-Speed Chromatography in Closed-Loop Fractionator Control," by M. M. Fourroux, F. W. Karasek and R. E. Wightman, ISA Journal, May, 1960, vol. 7, No. 5, pages 76–80. The above two articles further illustrate the use of the system described in the aforementioned British Patent No. 872,260.

A further disclosure of systems to which applicants' invention are adaptable is disclosed in the Chromatography Forum reported in The Oil and Gas Journal, April 21, 1958, pages 114–129.

In systems of the foregoing type applicants' method involving the generation of physical representations of straight line reaction paths in reaction space as a basis for system operation and for control of the reaction process represents a substantial advance in the art. Reactions of monomolecular character are immediately understandable. More complex reaction systems may be similarly studied so long as there is taken into account any approximations involved by reason of departure from the monomolecular systems described herein. While a reaction involving isomerization of hydrocarbons has been described in detail, it will be recognized that the method may be employed satisfactorily to represent, analyze and/or control many rate processes of importance in chemical kinetics, biochemistry and radioactive decay.

Multicomponent mixtures are processed such that the relative amounts of the $n$-constituents of each of $n-1$ different starting mixtures are known to represent compositions along straight line reaction paths leading to an equilibrium composition. The reaction paths are orthogonal one with respect to another in composition space by an equilibrium weighting function as specified in connection with Equation 25. The method includes measuring the relative proportions of the $n$-constituents at a plurality of time intervals for at least one starting mixture of the $n$-constituents which does not lie along any of the straight line reaction paths. By such measurement there is identified the ratios of reaction rates for each of the $n$-constituents relative to a selected one of the $n$-constituents. Thereafter two $n \times n$ matrix functions are generated where the first X matrix is representative of the $n$-constituents of $n-1$ starting mixtures and the equilibrium composition. A second matrix $\wedge'$ is a diagonal matrix of the ratios of reaction rates. From the two $n \times n$ matrix functions there is generated an output function involving the product of the two matrix functions and an inverse X matrix ($X^{-1}$).

It will be seen that the invention further involves the control of process parameters in a reaction involving $n$-constituents. An input charge stream may react in the direction of an equilibrium state for producing effluents of enhanced properties. In this aspect the invention involves analyzing the effluents produced under one set of process parameters by producing a set of physical conditions representative of the concentrations of $n$-constituents at an equilibrium state and of the differences between the concentrations of each of $n-1$ straight line reaction path starting mixtures and the concentration of the equilibrium state. The reaction paths are defined in a reaction simplex of $n-1$ dimensions and are orthogonal one with respect to the other. The physical conditions are then modified in dependence upon the ratios of reaction rates between the $n$-constituents for one set of parameters to produce a set of physical conditions indicative of the reaction rates between the $n$-constituents. In response to the modified physical conditions, at least one of the reaction parameters is thereupon altered for preferential enhancement of at least one of the effluents. In accordance with a further aspect of the invention, since considerable information is derived merely from a knowledge of the orientation and character of the reaction paths in mutually orthogonal conditions, it may be found wholly satisfactory to exercise control on the process conditions in dependence upon the character of the physical conditions representative of the X matrix which is expressive of concentrations of the constituents at equilibrium state and differences between the concentrations for each of $n-1$ straight line reaction path starting mixtures and the equilibrium concentration.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an operation where mixtures involving $n$-constituents are processed to produce output compositions under controlled process conditions wherein the relative amounts of said $n$-constituents of each of $n-1$ different starting mixtures are known to represent compositions along straight line reaction paths leading to an equilibrium composition and which paths are orthogonal one with respect to the other in composition space, the method of determining the constants which define the rate of change of one constituent to another in the course of said process which comprises measuring the relative proportions of said $n$-constituents at a plurality of time intervals for at least one starting mixture of said $n$-constituents which does not lie along any of said straight line reaction paths to identify the ratios of reaction rates for all said $n$-constituents relative to one of said $n$-constituents, in response to said measuring generating two $n \times n$ matrix functions where the first matrix X is representative of $n$-constituents of $n-1$ starting mixtures and said equilibrium composition and the second matrix $\wedge'$ is a diagonal matrix of said ratios of reaction rates, and generating an output function involving the product of said two matrix functions and the inverse matrix $X^{-1}$ of the matrix X.

2. In operations where mixtures involving $n$-constituents are processed to produce output compositions under controlled process conditions wherein the relative amounts of said $n$-constituents of each of $n-1$ different starting mixtures are known to represent compositions along straight line reaction paths leading to an equilibrium composition and which paths are orthogonal one with respect to the other in composition space, the method of determining the constants which define the rate of change of one constituent to another in the course of said process which comprises measuring the relative proportions of said $n$-constituents at a plurality of time intervals for at least one starting mixture of said $n$-constituents which does not lie along any of said straight line reaction paths to identify the ratios of reaction rates for all said $n$-constituents relative to one of said $n$-constituents, in response to said measuring generating two $n \times n$ matrix functions where the first matrix X is representative of $n$-constituents of $n-1$ starting mixtures and said equilibrium composition and the second matrix $\wedge'$ is a diagonal matrix of said ratios of reaction rates, and generating an output function consisting of the product of said two matrix functions and the inverse matrix $X^{-1}$ of the matrix X.

3. In operations where multicomponent mixtures involving $n$-constituents are processed to produce output compositions under controlled process conditions wherein the relative amounts of said $n$-constituents of each of $n-1$ different starting mixtures are known to represent compositions along straight line reaction paths leading to an equilibrium composition and which paths are orthogonal one with respect to the other in composition space, the method of determining the constants which define the rate of change of one constituent to another in the course of said process which comprises measuring the relative proportions of said $n$-constituents at a plurality of time intervals for at least one starting mixture of said $n$-constituents which does not lie along any of said straight line reaction paths to identify the ratios of reaction rates for all said $n$-constituents relative to one of said $n$-constituents whereby two $n \times n$ matrices may be formed, the first matrix X being representative of $n$-constituents of $n-1$ starting mixtures and said equilibrium composition and the second matrix $\wedge'$ being a diagonal matrix of said ratios of reaction rates, to describe said process.

4. In operations where mixtures involving $n$-constituents are processed to produce output compositions under controlled process conditions wherein the relative amounts of said $n$-constituents of each of $n-1$ different starting mixtures are known to represent compositions along straight line reaction paths leading to an equilibrium composition and which paths are orthogonal one with respect to the other in composition space, the method of determining the constants which define the rate of change of one constituent to another in the course of said process which comprises measuring the relative proportions of said $n$-constituents at a plurailty of time intervals for at least one starting mixture of said $n$-constituents which does not lie along any of said straight line reaction paths to identify the ratios of reaction rates for all said $n$-constituents relative to one of said $n$-constituents, in response to said measuring generating two $n \times n$ matrix functions where the first matrix X is representative of $n$-constituents of $n-1$ starting mixtures and said equilibrium compositions and the second matrix $\wedge'$ is a diagonal matrix of said ratios of reaction rates, and generating an output function involving the product of said two matrix functions.

5. In an operation where mixtures involving $n$-constituents are processed to produce output compositions under controlled process conditions wherein the relative amounts of said $n$-constituents of each of $n-1$ different starting mixtures are known to represent compositions along straight line reaction paths leading to equilibrium and which are orthogonal one with respect to the other in composition space, the method of determining the constants which define the rate of change of one constituent to another in the course of said process which comprises measuring the relative proportions of said $n$-constituents at at least two points along one reaction path other than said straight line reaction paths to identify the ratios of reaction rates for all said $n$-constituents relative to one of said $n$-constituents, and in response to said measuring generating functions representative of the relative rate constant matrix K' for analysis of interactions between said $n$-constituents under said conditions by forming $$K' = X \wedge' X^{-1}$$

where
X is a matrix of the $n$-constituents of said composition at equilibrium and of said starting mixtures,
$\wedge'$ is a diagonal matrix of said ratios of reaction rates, and
$X^{-1}$ is the inverse matrix of the matrix X.

6. In an operation where multicomponent mixtures involving $n$-constituents are processed to produce output compositions under controlled process conditions wherein the relative amounts of $n$-constituents of each of a plurality of different starting mixtures are known to represent reaction paths in composition space which are straight line paths leading to an equilibrium composition and are orthogonal one with respect to the other, the method of determining the constants which define the rate of change of one constituent to another in the course of said process which comprises measuring the relative proportions of said $n$-constituents at at least two points along one reaction path other than said straight line paths to identify the ratios of reaction rates among said $n$-constituents, measuring as a function of time the variations in the constituents of one starting mixture having representative amounts of all said $n$-constituents therein to identify a rate constant $\lambda_m$, and in response to said measuring forming functions representative of a rate constant matrix K descriptive of all interactions between said $n$-constituents under said conditions of the following form:

$$K = X \wedge' X^{-1} \lambda_m$$

where
X is a matrix of the constituents of all said starting mixtures,
$\wedge'$ is a diagonal matrix of said ratios, and
$X^{-1}$ is the inverse matrix of the X matrix.

7. In a process involving $n$-constituents where a charge stream reacts under controlled process parameters in the direction of an equilibrium state for production of effluents of enhanced properties, the method of control of said process which comprises analyzing said effluents for concentrations of said $n$-constituents at said equilibrium state and for the differences between concentrations in each of $n-1$ straight line reaction path starting mixtures and said concentrations at said equilibrium sate, the paths being defined in a reaction simplex of $n-1$ dimensions, modifying the analysis results in dependence upon ratios of reaction rates between said $n$-constituents for said set of parameters to produce a set of scalar functions indicative of reaction rates between said $n$-constituents, and in response to the scalar functions altering at least one of said parameters for preferential enhancement of at least one of said effluents.

8. In a process involving $n$-constituents where a charge stream is fed to a reactor wherein reaction conditions are controlled for reacting said $n$-constituents in the direction of an equilibrium state for production of effluents from said reactor of enhanced properties, the method of control of said reactor which comprises reacting in a zone separate from said reactor but maintained under said conditions repeated runs of said $n$-constituents in differing proportions, analyzing said constituents in said separate zone in response to said repeated runs to generate a set of scalar functions representative of concentrations of said $n$-constituents at said equilibrium state and of the differences between concentrations in each of $n-1$ straight line reaction path starting mixtures and said concentrations at said equilibrium state, the paths being defined in a reaction simplex of $n-1$ dimensions and in response to said scalar functions altering at least one reaction condition in said reactor for preferential enhancement of at least one of said effluents.

9. In an operation where mixtures involving $n$-constituents are processed to produce output compositions under controlled process conditions wherein the relative amounts of said $n$-constituents of each of $n-1$ different starting mixtures are known to represent compositions along straight line reaction paths leading to equilibrium and which are orthogonal one with respect to the other in composition space, the method of controlling the constants which define the rate of change of one constituent to another in the course of said process which comprises measuring the relative proportions of said $n$-constituents at at least two points along one reaction path other than said straight line reactions paths to identify the ratios of reaction rates for all said $n$-constituents relative to one of said $n$-constituents, in response to said measuring, generating functions representative of the relative rate constant matrix $K'$ for analysis of interactions between said $n$-constituents under said conditions by forming $$K' = X \wedge' X^{-1}$$

where:

$X$ is a matrix of the $n$-constituents of said composition at equilibrium and of said starting mixtures, $\wedge'$ is a diagonal matrix of said ratios of reaction rates, and $X^{-1}$ is the inverse matrix of the matrix $X$, and, controlling said process conditions in response to said functions.

10. In an operation where multicomponent mixtures involving $n$-constituents are processed to produce output compositions under controlled process conditions wherein the relative amounts of $n$-constituents of each of a plurality of different starting mixtures are known to represent reaction paths in composition space which are straight line paths leading to an equilibrium composition and are orthogonal one with respect to the other, the method of controlling the constants which define the rate of change of one constituent to another in the course of said process which comprises measuring the relative proportions of said $n$-constituents at at least two points along one reaction path other than said straight line paths to identify the ratios of reaction rates among said $n$-constituents, measuring as a function of time the variations in the constituents of one starting mixture having representative amounts of all said $n$-constituents therein to identify a rate constant $\lambda_m$, forming, in response to said measuring, functions representative of a rate constant matrix $K$ descriptive of all interactions between said $n$-constituents under said conditions of the following form:

$$K = X \wedge' X^{-1} \lambda_m$$

where:

$X$ is a matrix of the constituents of all said starting mixtures, $\wedge'$ is a diagonal matrix of said ratios, and $X^{-1}$ is the inverse matrix of the X matrix, and, controlling said process conditions in response to said functions.

References Cited by the Examiner

UNITED STATES PATENTS 2,892,684    6/1959    King _____ 23—209.6

OTHER REFERENCES

Hopp et al.: "Anal. Chem.," 30, 877–879, 1958.

DELBERT E. GANTZ, *Primary Examiner.*

ALPHONSO D. SULLIVAN, *Examiner.*

H. W. HAEUSSLER, G. E. SCHMITKONS,
*Assistant Examiners.*